United States Patent
Nordling

(10) Patent No.: US 12,541,911 B1
(45) Date of Patent: Feb. 3, 2026

(54) SYSTEMS AND METHODS FOR LOSS WEIGHTED IMAGE SAMPLING FOR NON-UNIFORM SPLAT GENERATION

(71) Applicant: Illuscio, Inc., Culver City, CA (US)

(72) Inventor: Joseph Nordling, Roeland Park, KS (US)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/307,286

(22) Filed: Aug. 22, 2025

(51) Int. Cl.
*G06T 15/10* (2011.01)
*G06T 17/00* (2006.01)

(52) U.S. Cl.
CPC .............. *G06T 15/10* (2013.01); *G06T 17/00* (2013.01); *G06T 2210/36* (2013.01)

(58) Field of Classification Search
CPC ...... G06T 15/10; G06T 17/00; G06T 2210/36
See application file for complete search history.

(56) References Cited

U.S. PATENT DOCUMENTS

2022/0207678 A1* 6/2022 Yao ........................... G06T 7/13

* cited by examiner

*Primary Examiner* — Edward Martello
(74) *Attorney, Agent, or Firm* — Ansari Katiraei LLP; Arman Katiraei; Sadiq Ansari

(57) ABSTRACT

A splat generation system and associated methods generate a non-uniform splat representation of a three-dimensional (3D) asset based on a loss weighted sampling of reference images that capture the 3D asset from different viewpoints. The system performs a first training iteration to define a different set of splats to reconstruct the field-of-view captured by a different one of the reference images. The system associates an amount of loss to each reference image based on an amount of variation by which a set of splats trained on that reference image reconstructs the field-of-view of that reference image. The system selects a next image to train on based on the amount of loss associated with each of the reference images, and retrains the set of splats representing the field-of-view of the selected next image by adjusting one or more of those splats to increase the reconstructed field-of-view accuracy.

20 Claims, 6 Drawing Sheets

SYSTEMS AND METHODS FOR LOSS WEIGHTED IMAGE SAMPLING FOR NON-UNIFORM SPLAT GENERATION

BACKGROUND

Gaussian splatting includes obtaining a set of images that capture a three-dimensional (3D) asset from different viewpoints, determining the relative positions of the cameras used to capture the set of images, and iteratively training on the individual images. The iterative training includes sequentially selecting each image, identifying or generating a set of splats that correspond to the field-of-view captured by the selected image, and modifying the set of splats (e.g., adding, removing, adjusting, or otherwise changing splat parameters) to better reconstruct the detail in the selected image. The training on the complete set of images is repeated until the splats reconstruct the detail within each image with an acceptable amount of loss.

Each image is treated with equal importance in the training phase and is selected the same number of times as every other image. Accordingly, images that capture insignificant detail or low complexity regions of the 3D asset such as a flat monochrome surface receive just as much training as complex images with lots of positional and color variation. The iterative training based on an equal sampling of the set of images produces a splat representation that has uniform detail or fidelity across all reconstructed surfaces or regions of the 3D asset.

The iterative training based on the equal sampling of the set of images increases the file size of the splat representation disproportionately relative to increases in detail or fidelity. In particular, the iterative training generates splats for surfaces or regions that have low complexity with the same detail or at the same resolution as the surfaces or regions that have high complexity. The added detail or resolution for the surfaces or regions with low complexity may be imperceptible or provide no tangible improvement in the visualization of the splat representation but still add to the file size of the splat representation.

Moreover, the equal treatment of images results in wasted processing cycles and additional delays to generate the splat representation. For instance, a first set of splats representing a low complexity region in the field-of-view of a first image may reconstruct the detail in the first image within three training iterations while a second set of splats representing a high complexity region in the field-of-view of a second image may reconstruct the detail in the second image within ten training iterations. Nevertheless, the first image is selected for all ten training iterations, the first set of splats are rasterized or rendered at each training iteration, a loss comparison between the rendered first set of splats and the first image is performed at each training iteration, and adjustments may be made even after the acceptable amount of loss has been reached for the field-of-view in the first image. Consequently, several of the training iterations performed on the first image may produce no tangible improvement in the reconstruction of the first image detail and only add to the overall time to output the final splat representation.

DETAILED DESCRIPTION OF PREFERRED EMBODIMENTS

The following detailed description refers to the accompanying drawings. The same reference numbers in different drawings may identify the same or similar elements.

Provided are systems and associated methods for a loss weighted sampling of images for non-uniform splat generation. The loss weighted sampling changes the likelihood or frequency with which different images are selected for splat training. In particular, images of a three-dimensional (3D) asset with detail that is reconstructed with a greater amount of loss by a set of splats from the generated splat representation are assigned a higher value or probability for selection in subsequent training iteration than images of the 3D asset with detail that is reconstructed with a lesser amount of loss by another set of splats from the generated splat representation. The values or probabilities are used to bias the image selection for next splat training iterations and to avoid the sequential selection and equal training on each image of the 3D asset the same number of times.

A splat generation system, that generates a non-uniform splat representation based on the loss weighted image sampling, disproportionately performs more training on the images with details that are reconstructed with greater loss by the splats and less training on the images with details that are reconstructed with less loss by the splats. The resulting non-uniform splat representation represents highly complexity surfaces or regions of the 3D asset at a higher level-of-detail, quality, and/or resolution and low complexity surfaces or regions of the 3D asset at a lower level-of-detail, quality, and/or resolution.

The loss weighted image sampling for splat generation reduces the overall time to generate the final splat representation, wherein the final splat representation reconstructs the details of the original 3D asset captured by the sampled images with an acceptable amount of loss. For instance, the loss weighted image sampling requires fewer training iterations based on fewer image selections than an equal and/or sequential selection of the images.

The loss weighted image sampling also generates a splat representation with a smaller total file size than splat representations generated from the equal and/or sequential selection of the images. As a result of unequal image sampling, fewer splats are defined to reconstruct the detail for the low complexity surfaces or regions of the 3D asset with the fewer splats still reconstructing the detail with the acceptable amount of loss, whereas the equal and/or sequential selection of the images may generate the splat representation with a greater number of splats to reconstruct the low complexity surfaces or regions of the 3D asset with greater detail that is unnecessary, unnoticeable, and/or does not yield any tangible improvement in the reconstruction of the low complexity surfaces or regions.

Figure 1:
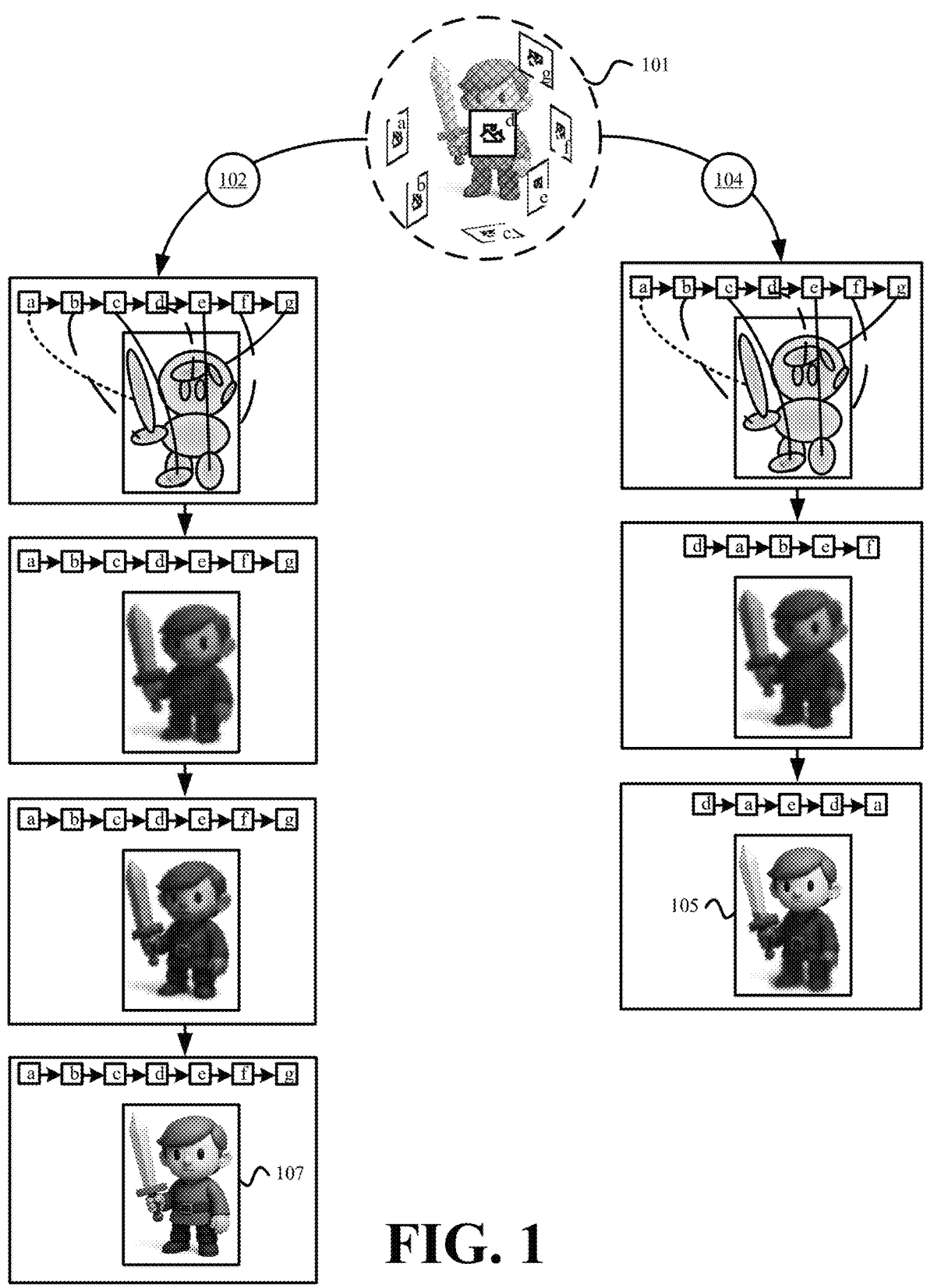
FIG. 1 illustrates the fewer training iterations and resulting non-uniformity associated with generating splats based on the loss weighted image sampling versus an equal and/or sequential image sampling in accordance with some embodiments presented herein.

FIG. 1 illustrates the fewer training iterations and resulting non-uniformity associated with generating splats based on the loss weighted image sampling versus an equal and/or sequential image sampling in accordance with some embodiments presented herein. Splat generation based either on the loss weighted image sampling and the equal and/or sequential image sampling requires reference images 101 as inputs for the training.

Reference images 101 capture a 3D asset from different viewpoints. In some embodiments, the 3D asset is defined with primitives of a mesh model, point cloud, high-resolution splat representation, and/or other 3D format t. For instance, the primitives of a mesh model encoding of the 3D asset include a connected set of meshes that collectively form the 3D shape and visual characteristics of the 3D asset. The primitives of a point cloud encoding of the 3D content asset include a distributed set of points that are each defined with a position and visual characteristics and that collectively form the 3D shape and visual characteristics of the 3D asset. In some such embodiments, reference images 101 are generated from a set of virtual cameras that are placed in the 3D space in which the 3D asset is defined. The virtual cameras capture the rendered visualization of the 3D asset from different viewpoints with each reference image 101 capturing a different set of surfaces or regions of the 3D asset from a different angle, orientation, or position. In some other embodiments, the 3D asset is a physical object or environment and reference images 101 capture different surfaces or regions of the physical object or environment from different viewpoints.

Training the splat representation based on the equal and/or sequential image sampling (at 102) includes selecting each reference image 101 the same number of times and training the set of splats that represent the field-of-view captured by the selected reference image 101 to better reconstruct the details in the selected reference image 101. Training on each reference image 101 may include rasterizing or rendering the set of splats representing the selected reference image 101 field-of-view, comparing the resulting visualization to the selected reference image 101, detecting variation between the visualizations, and modifying the set of splats by adding, removing, or adjusting the splats to reduce the detected variation. The training based on the equal and/or sequential image sampling (at 102) is repeated until the splats reconstruct the detail from all reference images 101 with an acceptable amount of loss. In other words, all reference images 101 are reselected for training if the field-of-view from just one reference image 101 is not reconstructed with the acceptable amount of loss.

Training the splat representation based on the loss weighted image sampling (at 104) includes selecting each reference image 101 a different number of times based on the loss associated with the field-of-view captured by each reference image 101 and training the sets of splats based on the unequal selection of the images. The first training iteration may include selecting each reference image 101 once and training based on the selected reference image 101. The training includes rasterizing or rendering the set of splats that form the field-of-view captured by the selected reference image 101, comparing the resulting visualization to the selected reference image 101, detecting variation between the visualizations, and modifying the set of splats by adding, removing, or adjusting the splats to reduce the detected variation. The loss computed from the amount of variation is associated back to the selected reference image 101 and is weighted to bias the selection of that reference image 101 for subsequent training iterations. The detail within reference images 101 that have low complexity or variation are likely to be reconstructed with less loss such that there will be fewer selections of those reference images 101 and fewer training iterations on those reference images 101 in order to reconstruct the represented regions or surfaces with the acceptable amount of loss. The detail within reference images 101 that have more complexity or variation are likely to be reconstructed with more loss such that those reference images 101 will be selected more than the reference images 101 with low complexity or variation and more training iterations will be performed on those reference images 101 with more complexity or variation.

As shown in FIG. 1, training based on the loss weighted image sampling (at 104) generates non-uniform splat representation 105 that reconstructs the visible and/or important detail from reference images 101 with an acceptable amount of loss with fewer image selections and with fewer total training iterations than training based on the equal and/or sequential image sampling (at 102). Moreover, the size of non-uniform splat representation 105 generated from training based on the loss weighted image sampling (at 104) is less than the size of uniform splat representation 107 generated from training based on the equal and/or sequential image sampling (at 102) because non-uniform splat representation 105 does not generate all surfaces or regions of the 3D asset at the same resolution or level-of-detail as is done by uniform splat representation 107. In particular, non-uniform splat representation 105 increases the resolution or level-of-detail for highly complexity surfaces or regions of the 3D asset and decreases the resolution or level-of-detail for low complexity surfaces or regions of the 3D asset where additional resolution or level-of-detail produces no noticeable improvement in the visual quality of the 3D asset. Uniform splat representation 107 represents surfaces or regions of low and high complexity at the same resolution or level-of-detail even though the added detail to the low complexity surfaces or regions provide imperceptible or negligible improvement in the splat representation visualization.

Figure 2:
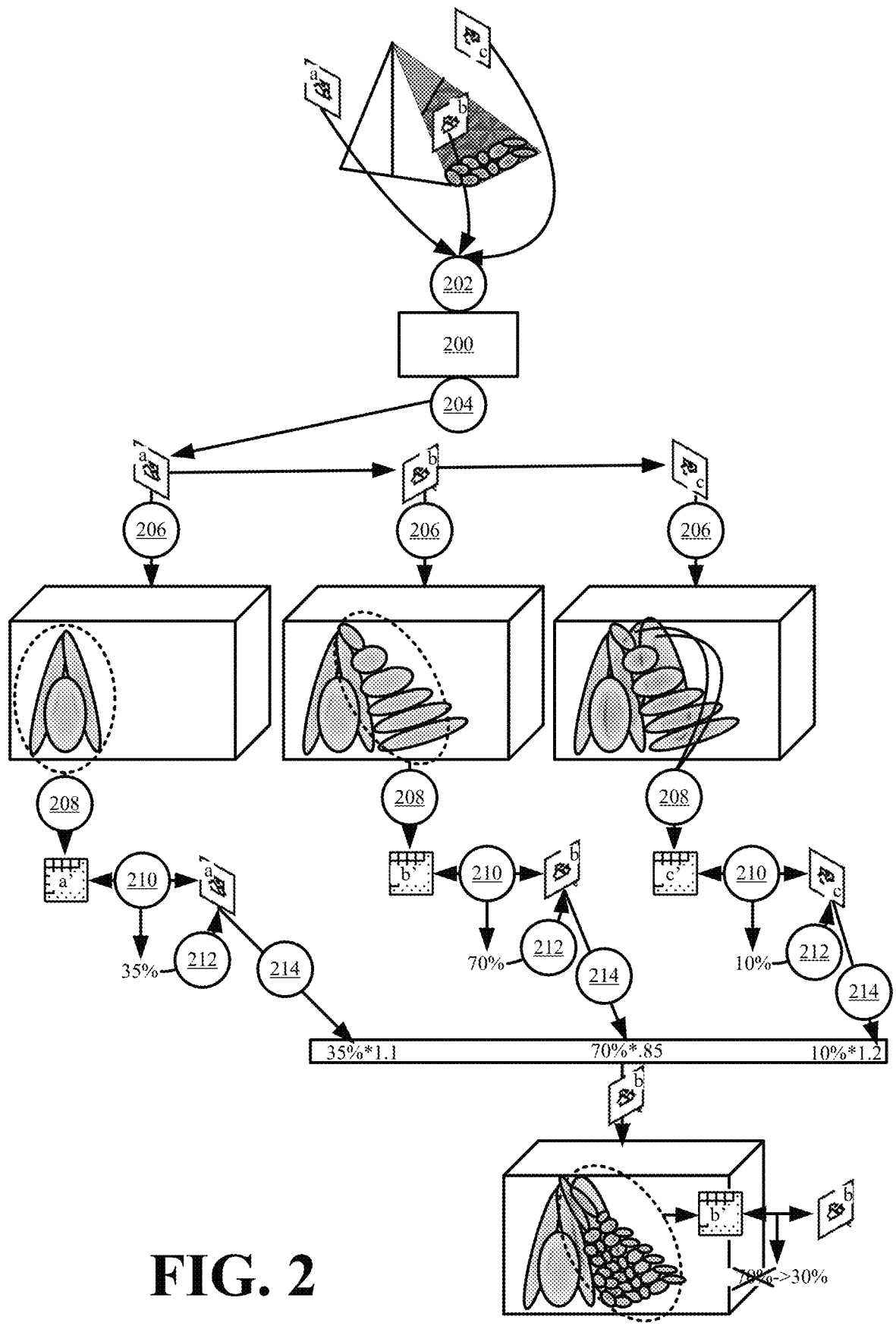
FIG. 2 illustrates an example of loss weighting images for splat generation in accordance with some embodiments presented herein.

FIG. 2 illustrates an example of loss weighting images for splat generation in accordance with some embodiments presented herein. Splat generation system 200 receives (at 202) a set of reference images from which to generate a splat representation of a 3D asset. The set of reference images may include images of a physical or real-world 3D object or environment or images of a digital model in a mesh, point cloud, or other 3D format. The set of reference images capture different surfaces or regions of the 3D asset from different viewpoints.

Splat generation system 200 selects (at 204) each reference image from the set of reference images during a first training iteration. For each selected (at 204) reference image, splat generation system 200 determines the field-of-view that is captured by the selected (at 204) reference image and trains (at 206) a set of splats to reconstruct that field-of-view. The training (at 206) may include generating and/or modifying individual splats from the set of splats. For instance, for the first training iteration, no splats may be defined to represent the field-of-view so splat generation system 200 may generate the set of splats. Alternatively, the set of splats may have been previously generated or modified when training on a different reference image that captures the same field-of-view from a different perspective or part of the field-of-view for the same or different perspective. Splat generation system 200 rasterizes or renders (at 208) the set of splats that are generated for the field-of-view of each selected (at 204) reference image in order to generate a visualization of the field-of-view represented by the set of splats. Splat generation system 200 compares (at 210) the resulting visualization against the selected (at 204) reference image to determine variation and/or quantify loss between the images. The loss may be computed based on a pixel-by-pixel comparison of the images and/or other comparisons. For instance, splat generation system 200 may use a human eye emulator or other neural network that spots visual differences between the two visualization or images in the same manner as a human.

In some embodiments, splat generation system 200 rasterizes or renders (at 208) the set of splats and performs the loss comparison (at 210) for a selected (at 204) reference image prior to training (at 206) the splats on that selected (at 204) reference image. In some such embodiments, splat generation system 200 uses the loss to direct the splat training. For instance, the loss may identify areas where the image rendered from the splats differs the most from the reference image, and splat generation system 200 may select the splats associated with those differing image areas or regions for adjustment. In some other embodiments, splat generation system 200 rasterizes or renders (at 208) the set of splats and performs the loss comparison (at 210) for a selected (at 204) reference image after training (at 206) the splats on that selected (at 204) reference image. In some such embodiments, splat generation system 200 uses the loss to direct subsequent splat training iterations when the reference image is reselected. In any case, splat generation system 200 associates (at 212) the determined loss to the selected (at 204) reference image before selecting (at 204) a next reference image.

After the first training iteration is complete and each reference images from the set of reference images is selected (at 204) and trained (at 206) on once, splat generation system 200 biases the reference image selection for subsequent iterations based on a randomized weighting of the loss associated (at 212) with each reference image. The loss may be quantified as a value between 1 and 100 and the randomized weighting may be applied (at 214) to the loss value in order to ensure that the reference image associated (at 212) with the greatest loss is not always or repeatedly selected. Always selecting the reference image associated (at 212) with the greatest loss may result in overfitting the splats to that reference image leaving the splats reconstructing the field-of-view of other images associated (at 212) with less loss potentially untouched or with a larger discrepancy in detail and/or fidelity. Accordingly, the randomized weighting ensures more visual continuity across the splat representation and splat generation system 200 performs a non-sequential and non-uniform selection of the reference images for subsequent training iterations, wherein the non-sequential and non-uniform selection may result in some reference images being selected and trained on more frequently and/or for a greater number of training iterations than other reference images. The loss associated (at 212) with a reference image may be updated whenever that reference image is selected for training and the adjustments to the set of splats made during the training increases or decreases the loss.

Figure 3:
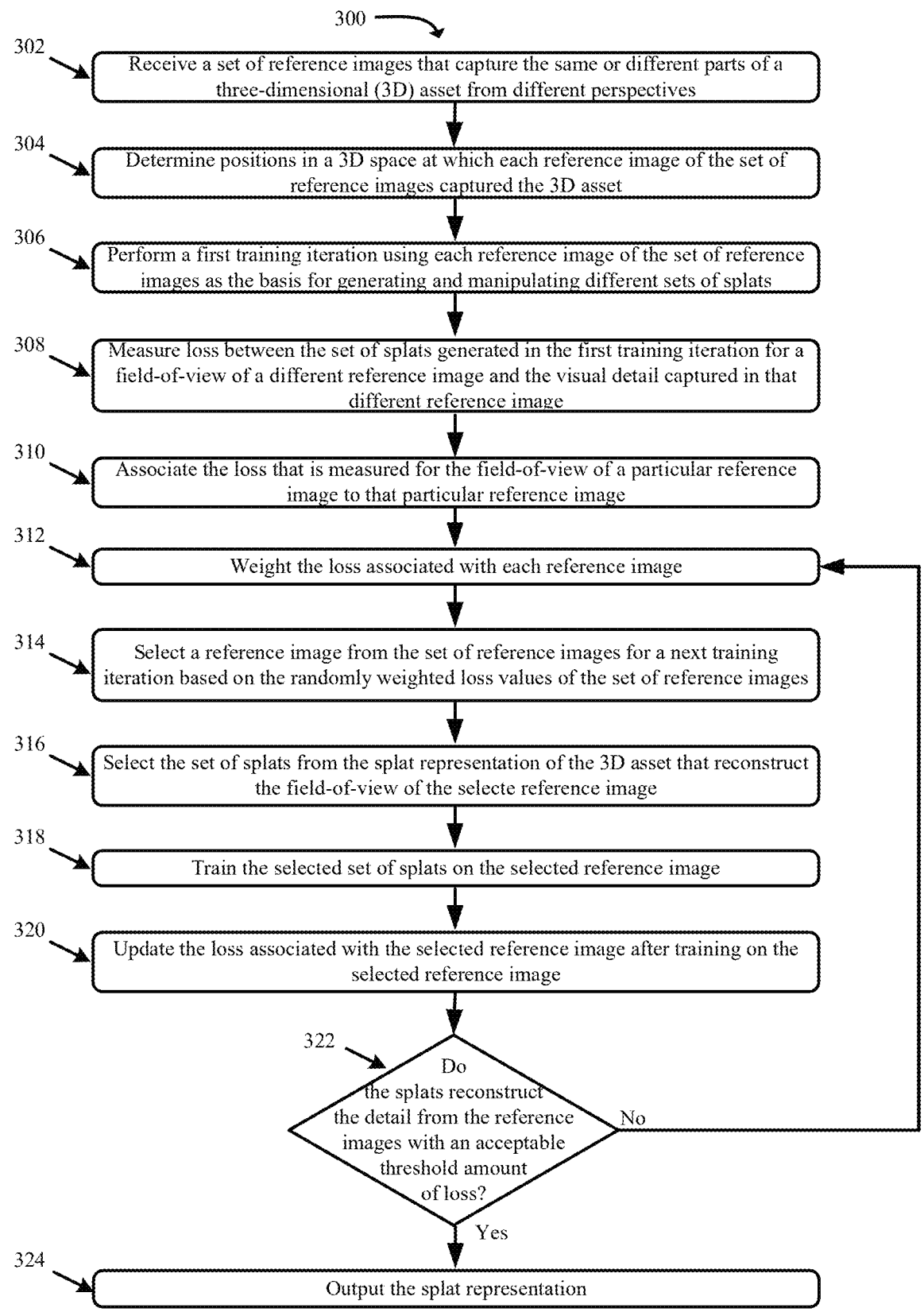
FIG. 3 presents a process for generating a non-uniform splat representation based on a loss weighted image sampling in accordance with some embodiments presented herein.

FIG. 3 presents a process 300 for generating a non-uniform splat representation based on a loss weighted image sampling in accordance with some embodiments presented herein. Process 300 is implemented by splat generation system 200.

Splat generation system 200 includes one or more devices or machines with processor, memory, storage, network, rendering, and/or other hardware resources for the generation of splat representations from other 3D formats or for optimizing existing high-resolution splat representations for streaming over a data network. In some embodiments, splat generation system 200 may be part of a streaming platform that streams the splat representations over a data network to facilitate a real-time or on-demand viewing of the 3D assets from which the splat representations were generated. In some other embodiments, splat generation system 200 is part of a spatial computing, gaming, or other 3D platform that generates splat representations of 3D models for viewing on local or remote devices.

Process 300 includes receiving (at 302) a set of reference images that capture the same or different parts of a 3D asset from different perspectives. In some embodiments, the set of reference images are generated by imaging or capturing a physical object or physical environment from the different perspectives. In some other embodiments, the set of reference images are generated by imaging or capturing a digital 3D object or digital environment from the different perspectives using virtual cameras. In some such embodiments, the 3D asset may be encoded in a non-splat format. For instance, the 3D asset may be encoded as a mesh model or a point cloud that is too large to stream in an acceptable amount of time over a data network or to create a real-time experience on the recipient device. A mesh encoding of the 3D asset may be defined with primitives that form a connected set of meshes. A point cloud encoding of the 3D asset may be defined with primitives that correspond to a disconnected set of points that are distributed about a 3D space. Alternatively, the 3D asset may be encoded as a high-resolution or high-fidelity Gaussian splat representation that is too large to efficiently stream or too large for a real-time streaming experience. Accordingly, the 3D asset may be converted to a lower-resolution or lower-fidelity 3D Gaussian splat representation that may be streamed to a client device over a data network in an acceptable amount of time for the real-time experience.

Process 300 includes determining (at 304) positions in a 3D space at which each reference image of the set of reference images captured the 3D asset. Splat generation system 200 may use a neural network, radiance field, and/or artificial intelligence and/or machine learning techniques to determine (at 304) the positions and/or orientations of the cameras or virtual camera that were used to capture each reference image.

Process 300 includes performing (at 306) a first training iteration using each reference image of the set of reference images as the basis for generating and manipulating different sets of splats. Performing (at 306) the first training iteration may include using a neural network to reconstruct the field-of-view represented by each reference image of the set of reference images at the determined (at 304) position in the 3D space with an initial set of splats. The initial set of splats generated for a reference image provides a rough approximation of that reference image's field-of-view. For instance, splat generation system 200 or the neural network may identify important visual details in a selected reference image and perform a single pass of generating and/or adjusting previously generated splats to reconstruct the identified visual details. The first training iteration performed on a current reference image may include adjusting or modifying one or more splats that were generated or adjusted in the first training iteration performed on a prior reference image with a field-of-view that partially overlaps with the field-of-view of the current reference image.

Process 300 includes measuring (at 308) loss between the set of splats generated in the first training iteration for the field-of-view of a different reference image and the visual detail captured in that different reference image. In some embodiments, splat generation system 200 measures (at 308) the loss for each reference image after training the splats on that reference image. In some embodiments, splat generation system 200 measures (at 308) the loss for each reference image before adjusting or modifying the set of splats that represent the selected reference image's field-of-view.

Measuring (at 308) the loss includes generating a visualization of the field-of-view by rasterizing and/or rendering the set of splats, comparing the visualization generated from the set of splats to the visualization within the reference image, and quantifying the differences between the two visualizations. The loss may be calculated based on positional and/or visual characteristic differences. For instance, differences in shapes and forms may correspond to a first amount of loss and differences in colors, transparency, reflectivity, and/or other visual characteristics may correspond to a second amount of loss. The first amount of loss and the second amount of loss may be summed to obtain the total loss.

In some embodiments, the loss is calculated based on loss detected using different techniques. For instance, a first amount of the loss may be calculated based on differences detected from a pixel-by-pixel comparison of the visualizations and a second amount of the loss may be calculated based on differences detected by a human eye emulator or other neural network that spots visual differences between the two visualizations in the same manner as a human.

Process 300 includes associating (at 310) the loss that is measured (at 308) for the field-of-view of a particular reference image to that particular reference image. The loss may include a value that is within a specified range.

Process 300 includes weighting (at 312) the loss associated (at 310) with each reference image. The weighting (at 312) ensures that the reference image associated (at 310) with the highest loss value is not always selected and improves the probability of other reference images with lower loss values being selected for a next training iteration. In some embodiments, the weighting (at 312) includes multiplying the loss value associated (at 310) with each reference image using a different randomly selected bounded value. For instance, a first reference image may have a loss value of 20% and may be weighted (at 312) with a random generated value of 0.9 and a second reference image may have a loss value of 18% and may be weighed (at 312) with a random generated value of 1.1 resulting in the second reference image having a higher weighted loss than the first reference image. In some embodiments, the weighting (at 312) may be optional or omitted.

Process 300 includes selecting (at 314) a reference image from the set of reference images for a next training iteration based on the weighted (at 312) loss values of the set of reference images. Splat generation system 200 may select (at 314) the reference image with the largest weighted loss value.

Process 300 includes selecting (at 316) the set of splats from the splat representation of the 3D asset that reconstruct the field-of-view of the selected (at 314) reference image. In some embodiments, splat generation system 200 determines the coordinates or boundaries for the reference image field-of-view based on the determined (at 304) position for the camera that captured the reference image and selects (at 316) the set of splats with positions within the coordinates or boundaries of the selected (at 314) reference image field-of-view.

Process 300 includes training (at 318) the selected (316) set of splats on the selected (at 314) reference image. The training (at 318) may include generating a visualization from rasterizing or rendering the set of splats, detecting differences between the generated visualization and the visualization of the selected (at 314) reference image, and modifying the set of splats based on the detected differences. For instance, splat generation system 200 detects where the splat-generated visualization has differing shapes and forms than the selected (at 314) reference image and modifies the splats at those positions to better reconstruct those shapes and forms. Similarly, splat generation system 200 detects where the splat-generated visualization has differing visual characteristics than the selected (at 314) reference image and modifies the splats at those positions to better reconstruct those visual characteristics. Modifying the set of splats may include defining new splats to include with the set of splats, removing splats from the set of splats, and/or adjusting the size, shape, position, and/or visual characteristics of the set of splats. Each splat may be defined with (x,y,z) coordinates, a covariance matrix that stores a scaling value for the radius or shape of the splat, orientation or rotational information, and/or other shape or positional parameters of the splat, and/or spherical harmonics that represent some visual characteristics of the splat. Accordingly, modifying the splats may include changing one or more of these and/or other splat parameters.

Process 300 includes updating (at 320) the loss associated with the selected (at 314) reference image after training (at 318) on the selected (at 314) reference image. In some embodiments, splat generation system 200 rasterizes or renders the modified set of splats, compares the resulting visualization against the visualization of the selected (at 314) reference image in order to quantify whether the loss decreased or increased as a result of the modifications to the set of splats, and updates (at 320) the loss to reflect the amount of loss associated with the modified set of splats. In some other embodiments, updating (at 320) the loss may include associating the loss that was calculated prior to modifying the set of splats to the selected (at 314) reference image.

Process 300 includes determining (at 322) whether the generated and/or modified sets of splats of the splat representation reconstruct the detail within the set of reference images with an acceptable threshold amount of loss. The determination (at 322) may be based on the individual loss values associated with each reference image. For instance, if the loss value associated with each reference image is less than 10%, then splat generation system 200 may determine (at 322—Yes) that the splats of the current splat representation reconstruct the detail from the set of reference images with the acceptable threshold amount of loss. The determination (at 322) may also be based on cumulative loss of the splat representation. For instance, splat generation system 200 may periodically (e.g., after 100 splatting iterations) render all splats and compare the resulting visualization to a visualization generated from rasterizing or rendering an original encoding of the 3D asset or from a reconstruction of the 3D asset that is generated from the set of reference images. If the compared visualizations have less than 10% variation, then splat generation system 200 may determine (at 322—Yes) that the splat representation reconstructs the detail within the set of reference images with the acceptable threshold amount of loss.

In response to determining (at 322-No) that the splat representation does not reconstruct the detail within the set of reference images with the acceptable threshold amount of loss, process 300 includes adjusting the weights attributed to the loss of each reference image via the weighting (at 312) and selecting (at 314) a next reference image to further train on. In other words, splat generation system 200 continues the non-uniform training based on the loss weighted selection of the reference images to improve sets of splats that have the greatest variations from the reference images that capture the fields-of-view represented by those sets of splats.

In response to determining (at 322—Yes) that the splat representation reconstructs the detail within the set of reference images with the acceptable threshold amount of loss, process 300 includes outputting (at 324) the splat representation for presentation to a requesting client device. Outputting (at 324) the splat representation may include caching or storing the splats of the splat representation in memory or storage of splat generation system 200 for subsequent distribution, presenting the splat representation on a device associated with splat generation system 200, or streaming the splat representation over a data network to a client device that issues a request to access the 3D asset.

In some embodiments, splat generation system 200 may adjust the selection of reference images for the first splatting iteration based on the complexity associated with each reference image. The reference image complexity may be determined based on the number of different surfaces, positional variation across the surfaces, and/or visual variety in the reference image. For subsequent splatting iterations, splat generation system 200 may bias or weight the loss associated with each reference image based on the complexity associated with each reference image. By incorporating the reference image complexity in the reference image selection, splat generation system 200 may ensure that the more detailed or more complex regions of the 3D asset are prioritized and generated with greater levels-of-detail than the less detailed or less complex regions of the 3D asset.

Figure 4:
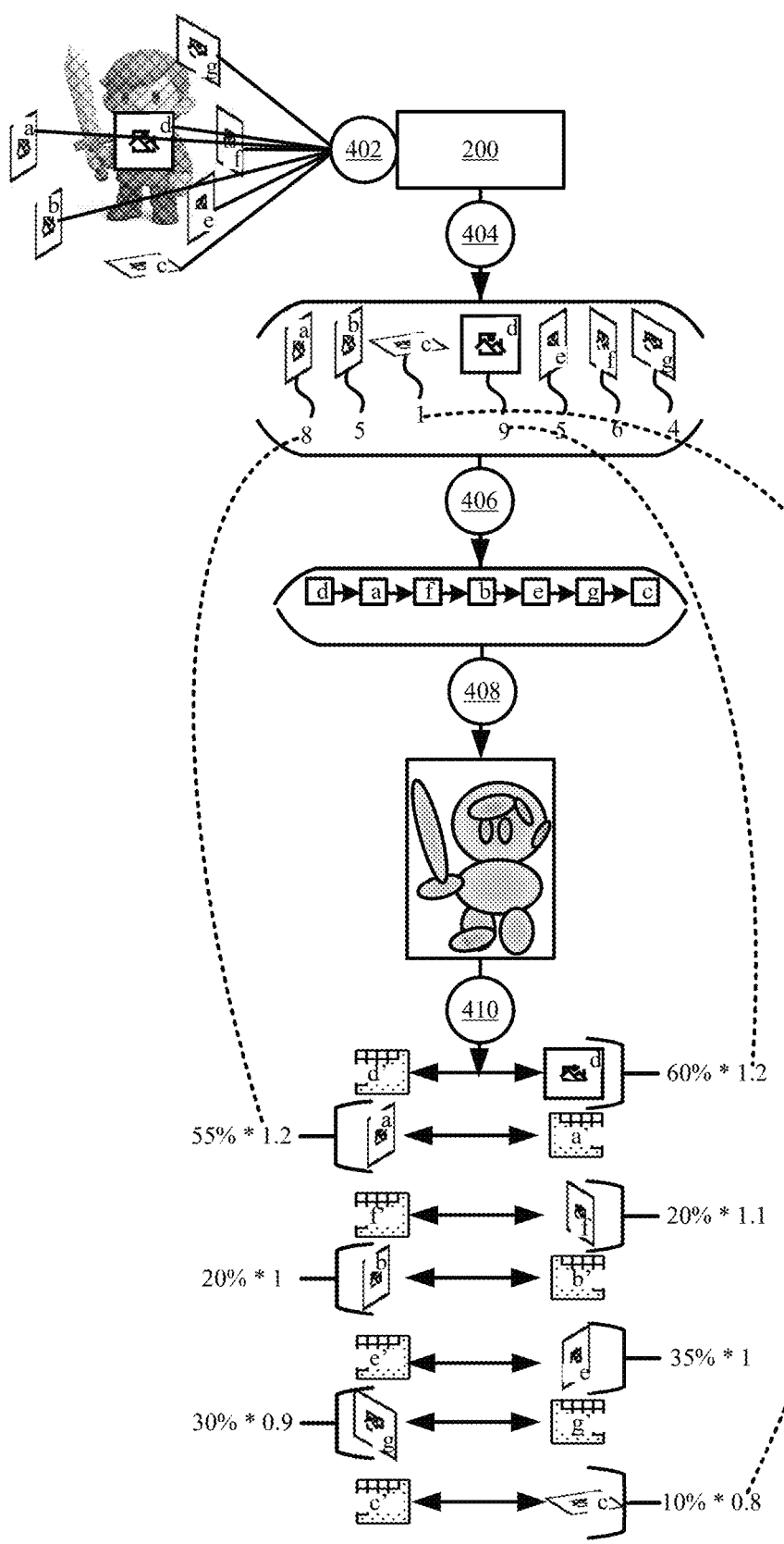
FIG. 4 illustrates an example of adjusting the reference image selection based on image complexity in accordance with some embodiments presented herein.

FIG. 4 illustrates an example of adjusting the reference image selection based on image complexity in accordance with some embodiments presented herein. Splat generation system 200 receives (at 402) the set of reference images for a 3D asset.

Splat generation system 200 classifies (at 404) the complexity associated with each reference image of the set of reference images based on the amount of positional and/or visual characteristic variation in each reference image. For instance, a reference image that captures a flat monochrome surface will be classified (at 404) as having low complexity, whereas a reference image that captures a textured or varying surface with different colors and reflectivity will be classified (at 404) as having high complexity.

Splat generation system 200 selects (at 406) the reference images for the first training iteration based on the classified (at 404) complexities. In some embodiments, the complexity classification (at 404) may be used as a substitute for a loss calculation for the first training iteration in which no splats or an insufficient number of splats may have been generated from which to accurately compute loss. In some such embodiments, splat generation system 200 selects (at 406) the reference images with the highest complexity first in order to focus the computational effort on the elements of the 3D asset that require the most iterations. In some other embodiments, splat generation system 200 selects (at 406) the reference images with the lowest complexity first in order to rapidly generate splats to reconstruct the simpler elements of the 3D asset.

Splat generation system 200 performs the training (at 408) based on the selected (at 406) reference images and may change subsequent selections to be based on the weighting of the loss associated with each reference image. In some embodiments, the weighting (at 410) may be based on the reference image complexity classification (at 404). For instance, reference images that are associated with greater complexities may have their loss values increased by some percentage that is commensurate with the complexity amount and reference images with lesser complexities may have their loss values decreased by some percentage that is commensurate with the complexity amount. The loss weighting based on the image complexity may be performed to prioritize the training for the reference image fields-of-view that are associated with the greatest loss and have the most visual detail that is differentiable by a viewer. For instance, a flat monochrome surface may be represented with a high degree of loss by a set of splats without significantly degrading the overall visualization as that surface has low complexity and the loss does not result in a loss of detail just inaccurate representation of the low complexity surface. However, a textured surface with varied coloring that is represented with a high degree of loss by a set of splats is noticeable and significantly degrades the overall visualization as the loss affects the detail reconstruction of that surface. To avoid empty regions in the splat representation, splat generation system 200 ensures that each reference image is selected at least once throughout the multiple training iterations performed by splat generation system 200.

The training based on the reference images that are selected via the loss weighting may be used to generate non-uniform splat representations that are optimized for streaming across data networks with different network performance and/or for prioritizing details at more complex regions when setting different maximum sizes for the splat representations. For instance, different client devices may request the 3D asset over data networks with different network performance. To provide a real-time streaming experience in which the 3D asset is streamed continuously without buffering at a desired frame rate, splat generation system 200 may limit the size or amount of data of the splat representation that is streamed to the client device. When generating the splat representation with uniform levels-of-detail, the size limit may result in much of the important detail being lost as each surface or region of the 3D asset is represented with the same amount of detail regardless of whether that surface is of high or low complexity. However, when generating the splat representation with non-uniform levels-of-detail, splat generation system 200 may allocate more splats or data to representing complex or important surfaces or regions of the 3D asset at a higher level-of-detail and fewer splats or data to representing less complex or less important surfaces or regions of the 3D asset at a lower level-of-detail.

Figure 5:
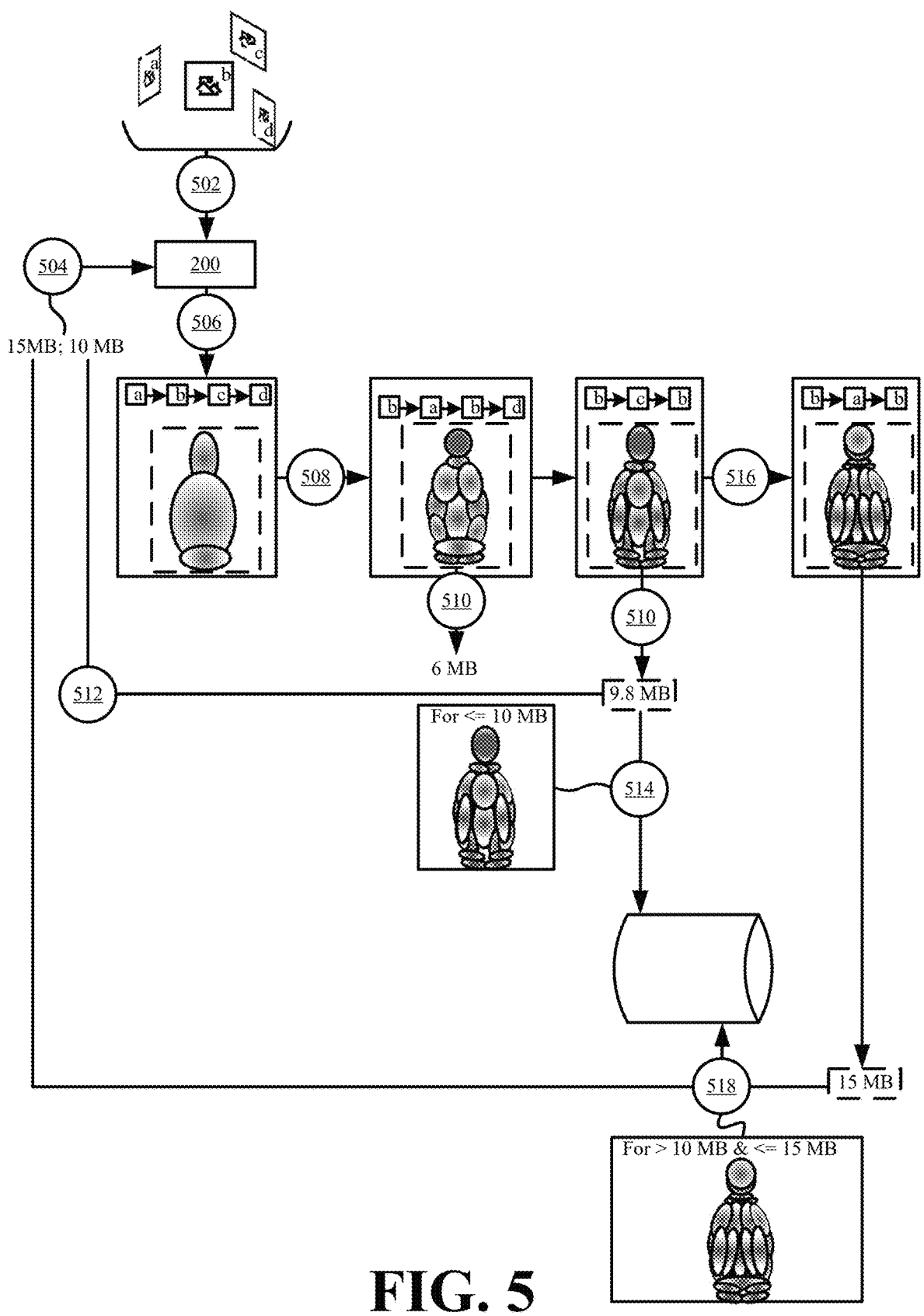
FIG. 5 illustrates an example of generating different size-constrained non-uniform splat representations based on the loss weighted selection of reference images in accordance with some embodiments presented herein.

FIG. 5 illustrates an example of generating different size-constrained non-uniform splat representations of a 3D asset based on the loss weighted selection of reference images in accordance with some embodiments presented herein. Splat generation system 200 receives (at 502) a set of reference images for a 3D asset. Splat generation system 200 also receives (at 504) constraints regarding different sizes at which to generate the splat generation for streaming across data network with different network performance. For instance, the constraints may specify generating a first splat representation at a first size (e.g., 10 megabytes) that may be streamed across networks supporting a first maximum bandwidth and a second splat representation at a second size (e.g., 15 megabytes) that may be streamed across network supporting a larger second maximum bandwidth.

Splat generation system 200 performs (at 506) the first training iteration by selecting each reference image once and training a set of splats on the selected reference image. Splat generation system 200 performs (at 508) subsequent training iterations based on the loss weighted selection of the reference images.

After one or more training iterations, splat generation system 200 determines (at 510) the total size of the resulting splat representation based on the data associated with the defined splats. Splat generation system 200 determines whether the total size exceeds any of the received (at 504) constraints.

In response to a first splat representation reaching (at 512) a first constraint after a first number of training iterations, splat generation system 200 outputs and stores (at 514) the first splat representation for streaming over data networks that are limited to the first maximum bandwidth. Due to the training based on the loss weighted selection of the reference images rather than an equal or sequential selection of the reference images, the first splat representation is a non-uniform splat representation with splats reconstructing fields-of-view associated with greater loss and/or higher complexity at a higher level-of-detail than splats reconstructing fields-of-view associated with lesser loss and/or lower complexity. In particular, more training iterations are performed for the fields-of-view associated with the greater loss than the fields-of-view associated with the lesser loss, wherein the fields-of-view associated with lesser loss may correspond to regions of the 3D asset with less detail or less visual complexity that may be accurately represented with fewer larger sized splats whereas the fields-of-view associated with greater loss may correspond to regions of the 3D asset with more detail or more visual complexity that may be accurately represented with more smaller sized splats.

Splat generation system 200 may continue the training until splat representations are generated for each constraint. In particular, splat generation system 200 may select more of the reference images to train (at 516) on based on the updated loss weighting of the reference images and further refine the splats from the splat representation output for a smaller sized constraint. Refining the splats may include reducing the loss associated with a selected reference image by defining more splats and/or reducing the size and repositioning the earlier generated splats to reconstruct finer details within the reference images. The training may be complete once a splat representation is generated and stored (at 518) to satisfy each of the received (at 504) constraints.

Figure 6:
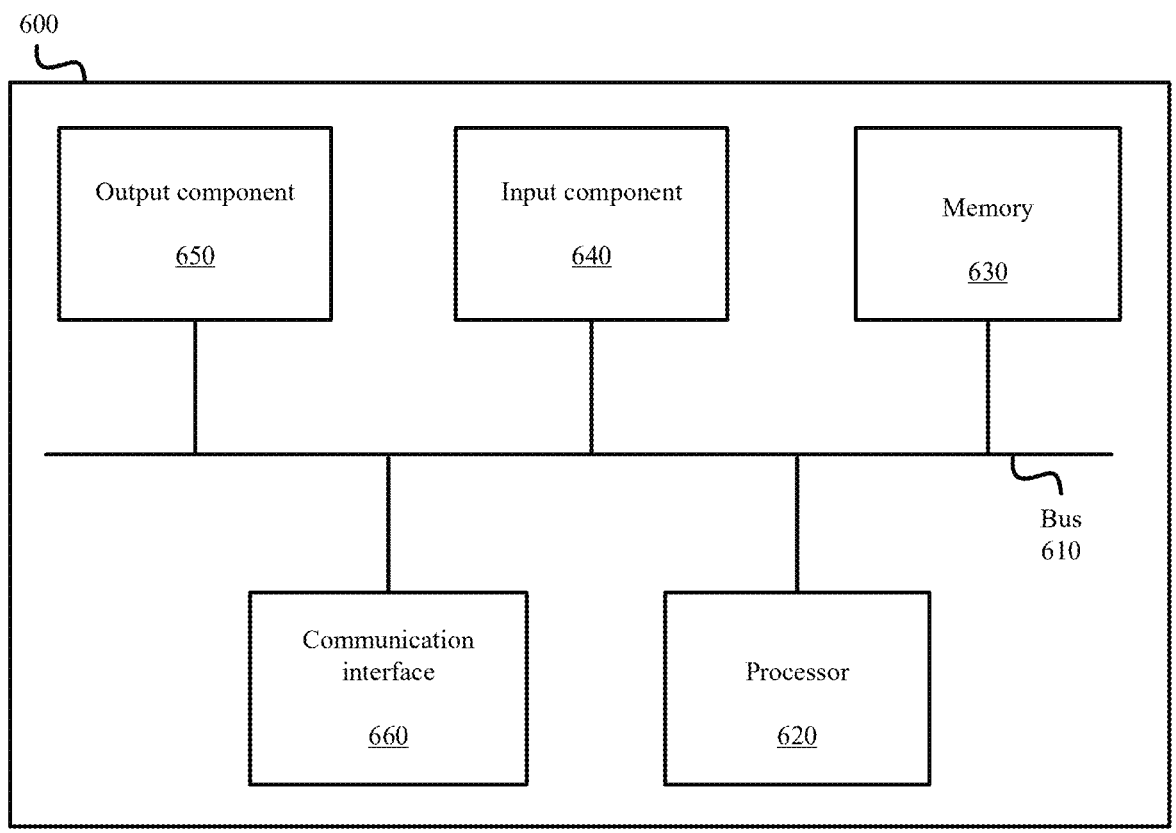
FIG. 6 illustrates example components of one or more devices, according to one or more embodiments described herein.

FIG. 6 is a diagram of example components of device 600. Device 600 may be used to implement one or more of the tools, devices, or systems described above (e.g., splat generation system 200). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a set of images that capture a three-dimensional (3D) asset from different fields-of-view;
   training sets of splats for a splat representation of the 3D asset based on the set of images, wherein training a set of splats from the sets of splats based on a particular image of the set images comprises defining the set of splats to reconstruct a field-of-view captured by the particular image;
   associating an amount of loss to each respective image of the set of images based on an amount of variation by which a set of splats trained on the respective image reconstructs the field-of-view of the respective image;
   selecting a next image from the set of images for a subsequent training iteration based on the amount of loss associated with each image of the set of images; and
   training a particular set of splats from the sets of splats based on the next image, wherein training the particular set of splats comprises adjusting one or more splats from the particular set of splats to increase an accuracy by which the particular set of splats reconstructs the field-of-view captured by the next image.

2. The method of claim 1 further comprising:
   generating the splat representation in response to a plurality of iterations of selecting the next image and training the particular set of splats based on the next image until each image of the set of images is associated with an acceptable amount of loss.

3. The method of claim 1 further comprising:
   outputting the splat representation in response to a plurality of iterations of selecting the next image and training the particular set of splats based on the next image until a cumulative amount of loss associated with the splat representation is within a threshold amount of acceptable loss for the 3D asset.

4. The method of claim 1 further comprising:
   weighting the amount of loss associated with each image of the set of images based on a random number that is generated for each image.

5. The method of claim 4, wherein selecting the next image comprises:
   determining the next image for training based on an image from the set of images that is associated with a greatest loss value, wherein the loss value is derived from said weighting of the amount of loss.

6. The method of claim 1 further comprising:
   generating the splat representation with a non-uniform level-of-detail based on a plurality of iterations of selecting the next image and the plurality of iterations resulting in an unequal number of times that each image of the set of images is selected for training.

7. The method of claim 1 further comprising:
   generating a visualization by rendering a set of splats that reconstruct the field-of-view captured by a specific image from the set of images;
   detecting differences between the visualization and the field-of-view captured by the specific image; and
   measuring the amount of loss associated with the specific image based on the differences detected between the visualization and the field-of-view captured by the specific image.

8. The method of claim 1 further comprising:
   updating the amount of loss associated with the next image in response to the adjusting one or more splats.

9. The method of claim 1 further comprising:
   streaming the splat representation over a data network to a requesting client device in response to a request for the 3D asset from the requesting client device.

10. The method of claim 1, wherein selecting the next image comprises:
    increasing a probability of an image associated with a greater amount of loss being selected for training; and decreasing a probability of an image associated with a lesser amount of loss being selected for training.

11. The method of claim 1 further comprising:
repeating said selecting of the next image and said training the particular set of splats based on the next image until the splat representation reconstructs details within the set of images with a threshold amount of loss.

12. A splat generation system comprising:
one or more hardware processors configured to:
   receive a set of images that capture a three-dimensional (3D) asset from different fields-of-view;
   train sets of splats for a splat representation of the 3D asset based on the set of images, wherein training a set of splats from the sets of splats based on a particular image of the set images comprises defining the set of splats to reconstruct a field-of-view captured by the particular image;
   associate an amount of loss to each respective image of the set of images based on an amount of variation by which a set of splats trained on the respective image reconstructs the field-of-view of the respective image;
   select a next image from the set of images for a subsequent training iteration based on the amount of loss associated with each image of the set of images; and
   train a particular set of splats from the sets of splats based on the next image, wherein training the particular set of splats comprises adjusting one or more splats from the particular set of splats to increase an accuracy by which the particular set of splats reconstructs the field-of-view captured by the next image.

13. The splat generation system of claim 12, wherein the one or more hardware processors are further configured to:
   generate the splat representation in response to a plurality of iterations of selecting the next image and training the particular set of splats based on the next image until each image of the set of images is associated with an acceptable amount of loss.

14. The splat generation system of claim 12, wherein the one or more hardware processors are further configured to:
   output the splat representation in response to a plurality of iterations of selecting the next image and training the particular set of splats based on the next image until a cumulative amount of loss associated with the splat representation is within a threshold amount of acceptable loss for the 3D asset.

15. The splat generation system of claim 12, wherein the one or more hardware processors are further configured to:
   weight the amount of loss associated with each image of the set of images based on a random number that is generated for each image.

16. The splat generation system of claim 15, wherein selecting the next image comprises:
   determining the next image for training based on an image from the set of images that is associated with a greatest loss value, wherein the loss value is derived from said weighting of the amount of loss.

17. The splat generation system of claim 12, wherein the one or more hardware processors are further configured to:
   generate the splat representation with a non-uniform level-of-detail based on a plurality of iterations of selecting the next image and the plurality of iterations resulting in an unequal number of times that each image of the set of images is selected for training.

18. The splat generation system of claim 12, wherein the one or more hardware processors are further configured to:
   generate a visualization by rendering a set of splats that reconstruct the field-of-view captured by a specific image from the set of images;
   detect differences between the visualization and the field-of-view captured by the specific image; and
   measure the amount of loss associated with the specific image based on the differences detected between the visualization and the field-of-view captured by the specific image.

19. The splat generation system of claim 12, wherein the one or more hardware processors are further configured to:
   update the amount of loss associated with the next image in response to the adjusting one or more splats.

20. A non-transitory computer-readable medium storing instructions that, when executed by one or more processors of a splat generation system, cause the splat generation system to perform operations comprising:
   receiving a set of images that capture a three-dimensional (3D) asset from different fields-of-view;
   training sets of splats for a splat representation of the 3D asset based on the set of images, wherein training a set of splats from the sets of splats based on a particular image of the set images comprises defining the set of splats to reconstruct a field-of-view captured by the particular image;
   associating an amount of loss to each respective image of the set of images based on an amount of variation by which a set of splats trained on the respective image reconstructs the field-of-view of the respective image;
   selecting a next image from the set of images for a subsequent training iteration based on the amount of loss associated with each image of the set of images; and
   training a particular set of splats from the sets of splats based on the next image, wherein training the particular set of splats comprises adjusting one or more splats from the particular set of splats to increase an accuracy by which the particular set of splats reconstructs the field-of-view captured by the next image.

* * * * *